United States Patent [19]

Yamazaki et al.

[11] 4,145,200

[45] Mar. 20, 1979

[54] PRODUCTION OF OPTICAL GLASS FIBERS

[75] Inventors: Tetsuya Yamazaki, Itami; Ken Koizumi, Kawanishi, both of Japan

[73] Assignee: Nippon Sheet Glass Co., Ltd., Osaka, Japan

[21] Appl. No.: 871,985

[22] Filed: Jan. 24, 1978

[30] Foreign Application Priority Data

Jan. 27, 1977 [JP] Japan .................... 52-8345

[51] Int. Cl.$^2$ .............................. C03B 37/02
[52] U.S. Cl. .......................... 65/2; 65/3 A; 65/12; 65/121
[58] Field of Search .......... 65/2, 3 A, 11 W, 121, 65/12

[56] References Cited

U.S. PATENT DOCUMENTS

| 3,791,806 | 2/1974 | Koizumi et al. ............ 65/121 X |
| 4,032,313 | 6/1977 | Tokuhara ..................... 65/121 X |
| 4,040,807 | 8/1977 | Midwinter et al. ................ 65/3 A |

FOREIGN PATENT DOCUMENTS 1194386  8/1970  United Kingdom ............... 65/3 A

*Primary Examiner*—Robert L. Lindsay, Jr.
*Attorney, Agent, or Firm*—Wenderoth, Lind & Ponack

[57] ABSTRACT

In a method for producing optical glass fibers which comprises co-spinning glass melts of different kinds through coaxially disposed discharge nozzles of a multimember crucible composed of two or more crucible members having a discharge nozzle at their bottom, the improvement wherein the outermost nozzle has a length of at least 30 mm and is heated so that at least a part of it is maintained at a temperature equal to, or higher than, the temperature of the crucible thereby to increase the speed of spinning; and a high-speed spinning furnace used therefor.

16 Claims, 11 Drawing Figures

PRODUCTION OF OPTICAL GLASS FIBERS

This invention relates to the production of optical glass fibers, and more specifically, to a method and an apparatus for producing by a high-speed spinning process low-loss optical glass fibers suitable for use as transmission channels in optical communication.

The term "optical glass fiber", as used in the present application, denotes a glass fiber consisting of a cylindrical elongated core and one or more cladding layers surrounding the core. A light beam entering one end of the optical glass fiber is transmitted within the core along the longitudinal direction of the fiber, and leaves the other end.

According to the prior art, optical fibers are produced by a method which comprises using a multimember crucible composed of two or more crucible members having a nozzle for discharging a glass melt at their bottom with the discharge nozzles being disposed coaxially, and co-spinning glass melts of different kinds from the discharge nozzles. For example, when an optical glass fiber is to be produced by using a two-member crucible, two large and small crucibles each of which has a nozzle for discharging a glass melt at its bottom are arranged so that the large crucible surrounds the small one and the two discharge nozzles are disposed coaxially. A core-forming glass is fed into the inner small crucible and a cladding glass, into the outer large crucible. The large crucible is externally heated to melt the glasses fed, and the core-forming and cladding glass melts are allowed to flow down respectively through the coaxially disposed nozzles, and drawn therefrom to form a glass fiber consisting of a core and a cladding layer which are coaxially arranged, and which, according to the take up speed, have an outside diameter of about 100 microns to about 200 microns and a core diameter of about 20 microns to about 100 microns.

By selecting a glass with a high refractive index as the core and a glass with a low refractive index as the cladding layer at this time, an optical glass fiber can be obtained. The resulting optical glass fiber has the cross-sectional shape shown schematically in FIG. 5, (a) of the accompanying drawings and the stepwise refractive index distribution as shown in FIG. 5, (b). In other words, the inside of the core 501 has a uniform high refractive index and the clad layer 502 has a uniform low refractive index, and a light beam entering one end of the glass fiber is transmitted through the core while totally reflecting on the interface between the core and the clad. In the present application, optical glass fibers having such a stepwise pattern of refractive index distribution are termed "step-type optical fibers".

On the other hand, by selecting glass containing an ion (dopant ion) having a high degree of contribution to refractive index, such as a thallium ion, as the core glass, and glass containing an ion having a low degree of contribution to refractive index, such as an alkali metal ion, as the cladding glass, and by exchanging the thallium ion with the alkali metal ion through the boundary of the two glasses during melt co-spinning, there can be obtained an optical fiber which has the cross-sectional shape shown in FIG. 5, (a), and the gradient refractive index distribution shown in FIG. 5, (c), whereby in the inside of the core 501, the refractive index decreases progressively in the radial direction from the center toward the peripheral boundary, and a light beam entering one end of the optical fiber is transmitted through the core by refraction. Preferably, but not absolutely, the refractive index is continuous as in FIG. 5, (c) at the boundary between the core 501 and the clad 502. In the present application, optical glass fibers which show such a refractive index distribution pattern that the refractive index decreases progressively in the radial direction are termed "forcusing-type optical fibers".

Conventional two-member crucibles are those in which the inside diameter of outer nozzle fixed to an outer crucible member is less than several millimeters, and the outer nozzle projecting from the lower end of the outer crucible member has a length of at most about 20 millimeters. Optical fibers requiring a low loss are produced by spinning at a speed of not more than several kilometers per hour while maintaining the temperature of the crucible at not more than about 1,000° C. In recent years, there has been a tremendous advance in optical fibers and other optical communication devices, and the last problem which the manufacturers desire to solve in putting such optical communication systems into commercial practice is the reduction of the cost of producing the individual devices.

The multi-member crucible method is a continuous process ranging from a step of melting glass to a step of producing spun fibers, and can continuously give optical glass fibers. Hence, it is a superior manufacturing process suitable for mass production. The speed of spinning, however, is less than one-tenth the speed of drawing of wires for conventional communication channels produced from copper as a raw material, and the cost of production is higher than in the case of producing copper wires. To obtain a drastic reduction in the cost of production, it is especially necessary to increase the speed of spinning. Generally, two methods are used to increase the speed of spinning in accordance with conventional techniques. One involves increasing the diameters of nozzles provided at the bottoms of multiple crucible members and thereby increasing the amount of molten glass that flows through the nozzles. According to this method, however, a deviation or turbulence occurs in the flow of the glass melt at the nozzle portion because of the influence of the convection of the glass melt within the crucible. This consequently tends to cause a variation in the outside diameter of the resulting fiber or the diameter of the core, and also in the eccentricity of the core. For this reason, the efficiency of connecting fibers at their ends is poor, and it is difficult to construct long-distance transmission channels from such fibers.

The other method consists in increasing the temperature of the crucible to reduce the viscosity of glass and to increase the amount of molten glass flow. According to this method, however, when the temperature of the crucible is raised, impurity ions in the material that constitutes the crucible diffuse in the glass melt, and the loss of light absorption in the fiber increases. It is difficult therefore to build transmission lines of low loss. Accordingly, in practice, the conventional techniques cannot produce optical fibers of low loss by increasing the speed of spinning.

The above description is directed mainly to the production of optical fibers by the two-member crucible method, but is applicable also to the production of optical fibers by using a crucible consisting of three or more members. The three-member crucible method is the one in which the outermost crucible member is provided outside the two-member crucible, and glass having a higher refractive index or light absorbability is fed into the outermost crucible member. Thus, an optical fiber of a three-layer structure is spun through three nozzles coaxially disposed at the bottom of the crucible.

It is an object of this invention to provide a method for producing by high-speed spinning low-loss optical fibers with a greatly reduced variation in their outside and core diameters and a greatly reduced deviation in the arrangement of their core.

Another object of this invention is to provide a method for producing by high-speed spinning optical glass fibers of low loss while maintaining the temperature of the crucible at a relatively low temperature, and therefore inhibiting the diffusion of impurities from the material constituting the crucible into glass melts.

Still another object of this invention is to provide an apparatus for producing by high-speed spinning low-loss optical glass fibers with a greatly reduced variation in their outside and core diameters and a greatly reduced deviation in the arrangement of their core.

Still other objects and advantages of the invention will become apparent from the following description.

The present invention provides an improved method for producing optical glass fibers which comprises co-spinning glass melts of different kinds through coaxially disposed discharge nozzles of a multi-member crucible composed of two or more crucible members having a discharge nozzle at their bottom; wherein the outermost nozzle has a length of at least 30 mm and is heated so that at least a part of it is maintained at a temperature equal to, or higher than, the temperature of the crucible thereby to increase the speed of spinning.

According to this invention, the above method can be performed by using a high-speed spinning furnace for optical glass fibers which comprises a multi-member crucible composed of two or more crucible members having a glass melt discharging nozzle at their bottom, the nozzles being disposed coaxially, and means for externally heating the multi-member crucible and the discharge nozzles, the outermost nozzle having a length of at least 30 mm.

The present invention is described in greater detail by reference to the accompanying drawings in which.

Figure 6:
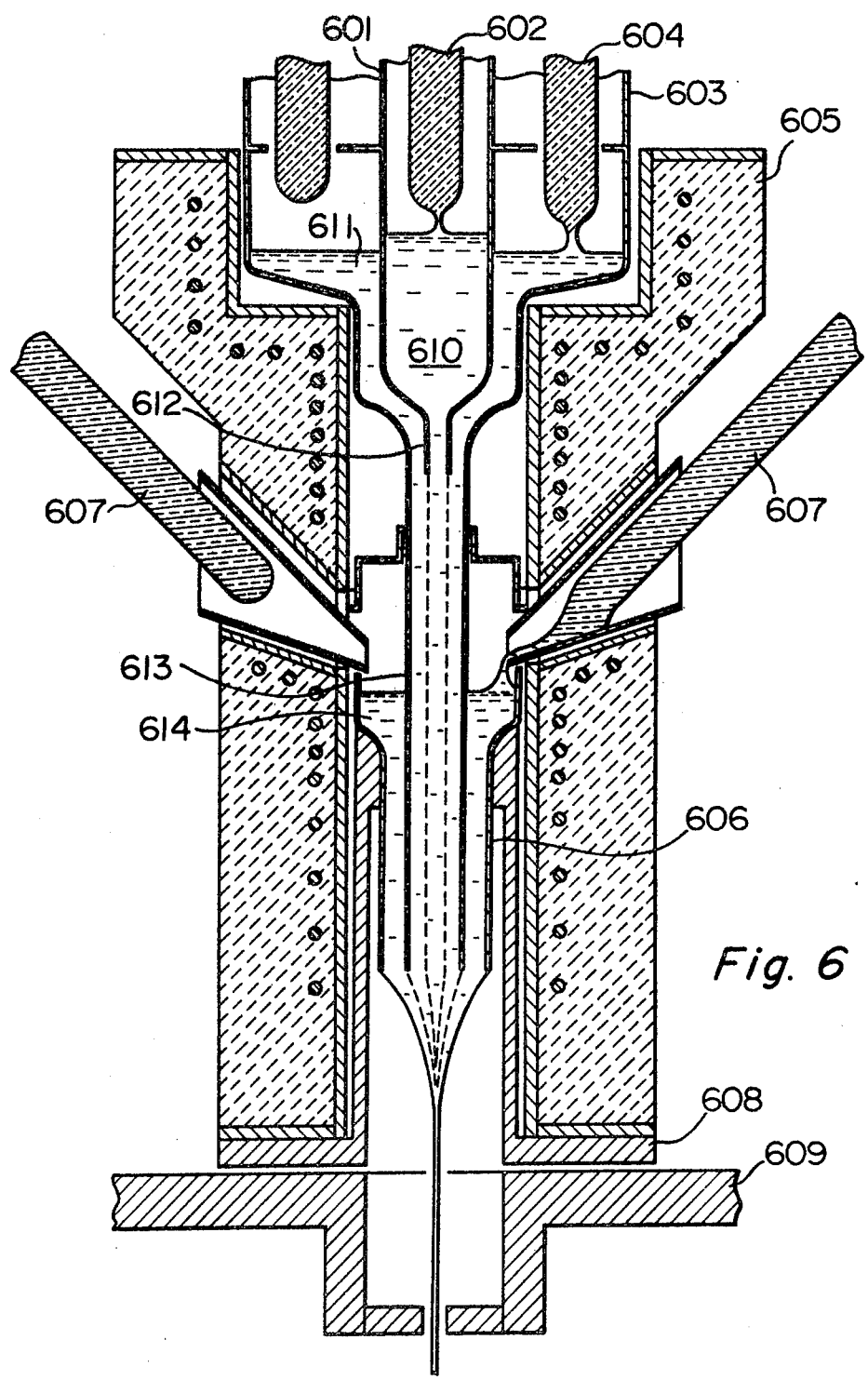

FIG. 5, (a), (b) and (c) respectively show the cross-sectional shape of an optical fiber produced by the two-member crucible method of this invention, a chart of the refractive index distribution of a step-type optical fiber, and a chart of the refractive index distribution of a focusing-type optical fiber (n represents the refractive index, and r, the radius of the fiber);

FIG. 5, (d), (e) and (f) respectively show the cross-sectional shape of an optical fiber having a three-layer structure produced by the method of this invention, a chart of the refractive index distribution of a step-type optical fiber, and a chart of the refractive index distribution of a focusing-type optical fiber; and FIG. 6 is a sectional view of a spinning furnace showing another example of spinning optical fibers having a three-layer structure by the method of this invention.

The invention is first described with reference to the method of spinning using a two-member crucible shown in FIGS. 1 to 3. It should be understood that the scope of the invention is not limited by the following description, and various modifications and changes obvious to those skilled in the art are possible within the scope of the invention.

Figure 1:
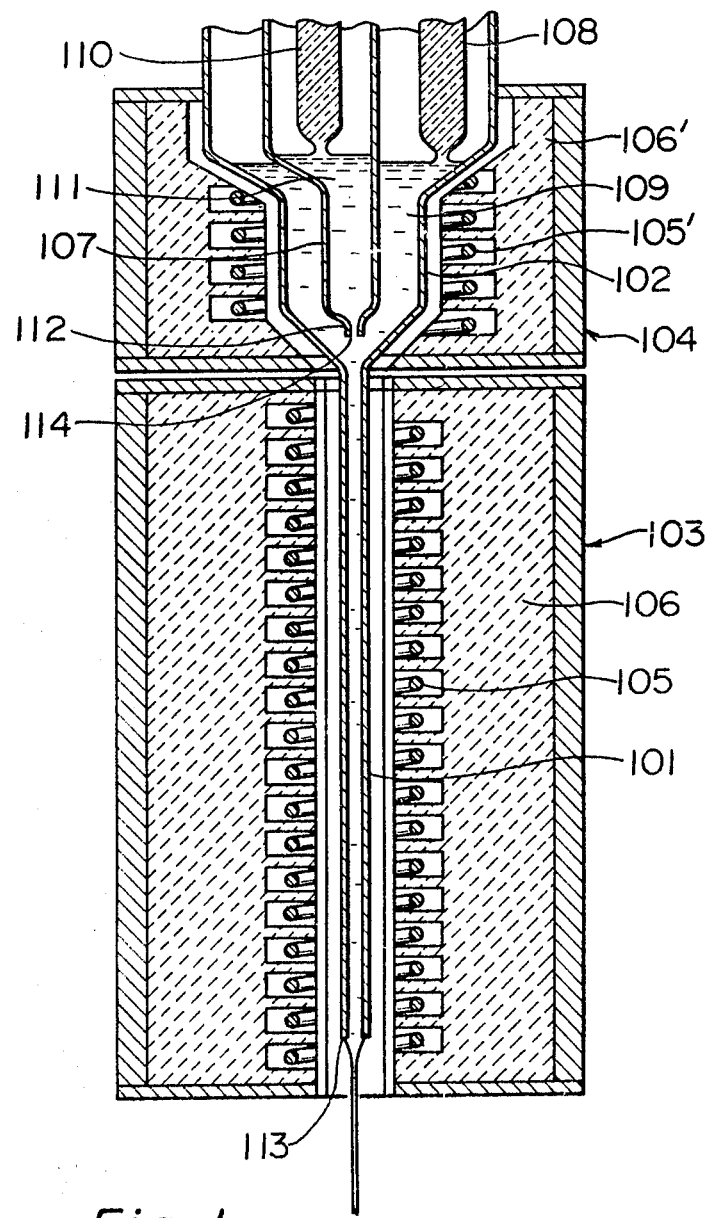
FIG. 1 is a sectional view of a spinning furnace which shows the principle of performing the present invention.

FIG. 1 is a cross-sectional view of a high-speed spinning furnace showing the principle of performing the present invention by using a method for externally heating the crucible indirectly by using an electric furnace. In FIG. 1, the crucible consists of an outer crucible member 102 and an inner crucible member 107, and is set at a predetermined position within the electric furnace. The outer crucible member 102 has as its bottom a cylindrical elongated metallic outer nozzle 101 which is heated to a high temperature by an electric furnace 103 for nozzle heating. On the other hand, the outer crucible member 102 is heated to a high temperature by an electric furnace 104 for crucible heating. The electric furnaces 103 and 104 have refractory materials 106 and 106' and heaters 105 and 105' surrounded by the refractories. The heaters 105 and 105' generate heat by being electrically controlled so that the temperatures of the outer nozzle 101 and the outer crucible member 102 are maintained at predetermined points. In the two-member crucible, the outer nozzle 10 is an outermost nozzle.

The inner crucible member 107 is disposed within the outer crucible so that an inner nozzle 112 provided at the bottom of the inner crucible member is located coaxially with the outer nozzle 101.

When an optical glass fiber is to be spun by the method of this invention using such a two-member crucible, a glass rod 108 for a cladding layer of the fiber is fed into the outer crucible member 102, and heated in it to become a melt 109 which flows down through the outer nozzle 101 and drawn from an exit 113 of the nozzle. Likewise, a glass rod 110 for a core of the fiber is fed into the inner crucible member 107 and heated in it to become a melt 111 which flows through the inner nozzle 112 and out into the glass melt 109 within the outer nozzle 102. It forms a laminar flow, and moves down through the center of the outer nozzle and drawn from the nozzle exit 113. Instead of the glass rods 108 and 110, glass already in the molten state may be supplied to the crucible members.

In the production of step-type optical glass fibers, a glass composition having a relatively low refractive index is used as a material for a cladding layer, and a glass composition having a higher refractive index is selected as a core-forming glass. Glass compositions usually empoloyed in the art can be used as materials for the cladding and core in this invention. Examples of the cladding glass are silicate glass, borosilicate glass, and soda-lime-silicate glass which have a refractive index of 1.49 to 1.54. Suitable materials for the core glass are silicate glass, borosilicate glass, and soda-lime-silicate glass having a refractive index of 1.50 to 1.59.

For the production of focusing-type optical glass fibers, silicate glass containing an alkali metal ion having a low degree of contribution to refractive index, such as at least one of Li, Na, K, Rb and Cs, for example, is used as a material for a cladding layer. As a core-forming glass, glass having a metallic ion with a high degree of contribution to refractive index, such as a thallium ion, for example, is used. During the spinning, the Tl ion in the core glass diffuses into the cladding glass, and the alkali metal ion in the cladding glass diffuses into the core glass, both at the boundary between the core glass and the cladding glass. In the inside of the core of the resulting optical fiber, the Tl ion concentration decreases progressively, and the alkali metal ion concentration progressively increases, from the center toward the radial direction, and because of this concentration distribution, the inside of the core has such a refractive index distribution that the refractive index decreases progressively from the center toward the radial direction.

Of the alkali metals, a Cs ion has a greater degree of contribution to refractive index than other alkali metal ions. For this reason, a focusing-type optical glass fiber can also be produced by using a Cs ion-containing glass as a core glass and a glass containing at least one of Li, Na, K and Rb as a cladding glass.

Generally, platinum of high purity is used as a material for the crucible and nozzles. Other highly heat-resistant materials, such as platinum-iridium alloy, quartz glass, alumina, tungsten and molybdenum can also be used.

When platinum is heated to a temperature of at least about 1200° C., traces of impurities in it, especially an iron ion and a copper ion, diffuse into glass melts, and as a result, the glass has an increased loss of light absorption. Since the glass melts reside for a relatively long period of time in the crucible, the inside of the inner crucible member 107 which accommodates the core glass melt 111 requiring a low loss of light absorption, and its vicinity are desirably maintained at a temperature sufficiently lower than about 1200° C., preferably at a temperature above the melting temperature of the glass fed but below 1000° C., and more preferably about 850° to about 950° C.

Within the outer nozzle 101, the glass melts 109 and 111 flow down as a laminar stream. However, it is only the cladding glass melt 109 which directly makes contact with the wall surface of the heated platinum outer nozzle. Moreover, since the residence times of these glass melts in the outer nozzle 101 are relatively short, even when the impurity ions diffuse into the cladding glass melt 109, the diffused layer stops at the cladding glass melt 109, and does not reach the core-forming glass melt 111. Hence, the temperature of the outer nozzle 101 can be made higher than the temperature of the crucible, and even if the temperature of the outer nozzle exceeds about 1200° C. for example, the low loss of the resulting optical glass fiber is not impaired. Thus, the outer nozzle 101 can be heated and maintained at a temperature which is equal to or higher than the temperature of the crucible. Desirably, it is heated and maintained at a temperature of at least 25° C., preferably at least 50° C., especially 75°–150° C., higher than the temperature of the crucible. Advantageously, heating is effected such that the temperature of the outer surface of the outer nozzle 101 is at least about 950° C., preferably at least about 1000° C., more preferably about 1050° to about 1150° C.

It is desirable at this time that substantially the entire outer nozzle in its longitudinal direction be heated at the above-specified temperature. This is however not essential, and that portion of the outer nozzle which is near the outer crucible member and/or the exit or its vicinity of the outer nozzle may be at a temperature lower than the specified temperature. In short, in the present invention, at least a part of the outer nozzle, preferably at least the central portion of the outer nozzle in its longitudinal direction, is heated and maintained at a temperature which is equal to or higher than the temperature of the crucible. If the portion of the outer nozzle which is maintained at the above temperature is too small, it is likely that high-speed spinning will not be achieved. Desirably, therefore, at least one half, preferably at least two-thirds, of the length of the outer nozzle should be maintained at the above-specified temperature.

The term "temperature of the crucible", as used in the present application, denotes the surface temperature of the outer wall of the outermost crucible member connected to the outermost nozzle, that is the outer crucible member designated at 102, 203, 303, 405 and 603 in FIGS. 1 to 4 and 6, unless otherwise specified.

The flow rate of glass which flows down through the outer nozzle 101 is determined according to the water heat value, the viscosity of the glass, and the shape of the nozzle, i.e. the inside diameter and length of the nozzle. It is empirically known that the flow rate is inversely proportional to the viscosity of the glass and the length of the nozzle, and is proportional to the fourth power of the inside diameter of the nozzle.

Generally, at high temperatures at which spinning is performed, the viscosity of glass decreases to an order of one-tenth if its temperature rises by about 100° C. This means that the flow rate of the glass increases to an order of 10 times, and in other words, the spinning speed for optical fiber formation increases to an order of 10 times. The heated long outer nozzle 101 shown in FIG. 1 serves to decrease the viscosity of the melt flowing therethrough and greatly increasing the flow rate of the glass melt while maintaining the melt in the form of a laminar flow. The flow rate of the glass melt flowing through the nozzle decreases proportionally to the length of the nozzle, but this decrease can be made up for by slightly increasing the inside diameter of the nozzle.

If the length of the outer nozzle 101 is too short, it is difficult to heat the outer nozzle alone at the desired high temperature without increasing the temperature of the crucible to the undesired high temperature. Hence, it is recommendable to adjust the length of the outermost nozzle to at least 30 mm. There is no strict upper limit to the length of the outermost nozzle. However, if its length is too large, the flow rate of a glass melt flowing therethrough decreases markedly, and the object of high-speed spinning in accordance with the present invention is difficult to achieve. Generally, it is desirable for the length of the outermost nozzle not to exceed 2,000 mm. Advantageously, the length of the outermost nozzle is within the range of 50 to 1500 mm, especially preferably 100 to 1000 mm.

In the present application, the term "length of a nozzle" denotes the distance of the nozzle from its one end fixed to the bottom of a crucible member to its forward end along the central axis of the nozzle.

The inside diameter of the outermost nozzle (outer nozzle 101 in FIG. 1) is not critical, and can be varied over a wide range according to the type of the material glass, the heating temperature, the desired diameter of the glass fiber, etc. It is at least necessary that the glass melts flow therethrough in the form of a laminar flow. It is advantageous that the inside diameter of the outermost nozzle is generally 3 to 50 mm, preferably 4 to 30 mm, especially 5 to 20 mm. For the same reason as above, the ratio of the length to diameter of the outermost nozzle is chosen from the range of 3 to 100, preferably the range of 5 to 60, and more preferably the range of 10 to 50.

Figure 2:
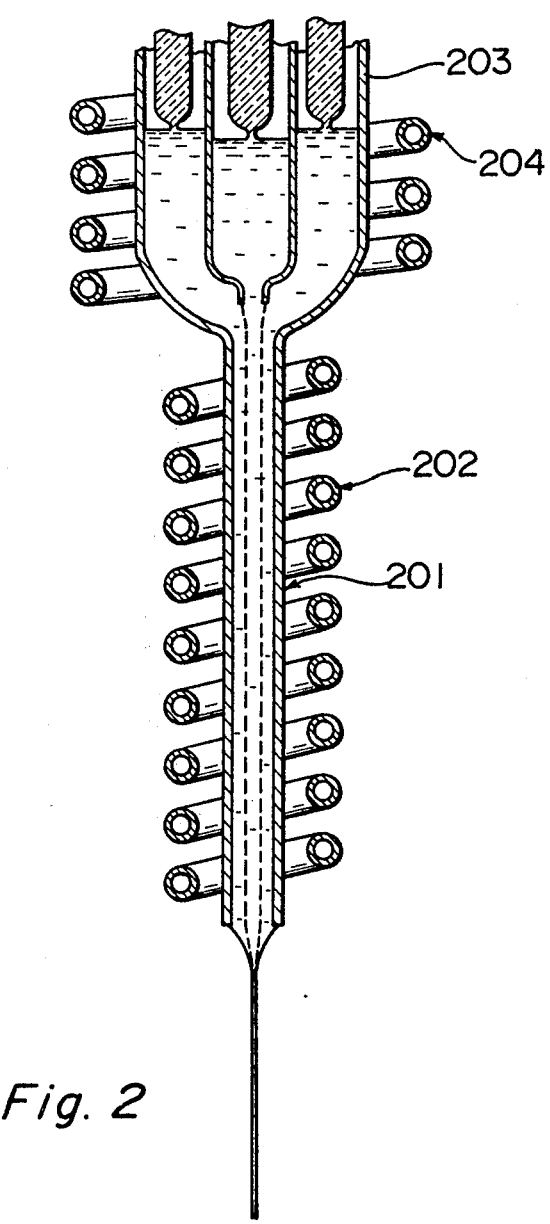
FIG. 2 is a sectional view of a spinning furnace which shows the performance of this invention using a method of direct nozzle heating by high frequency induction.
Figure 3:
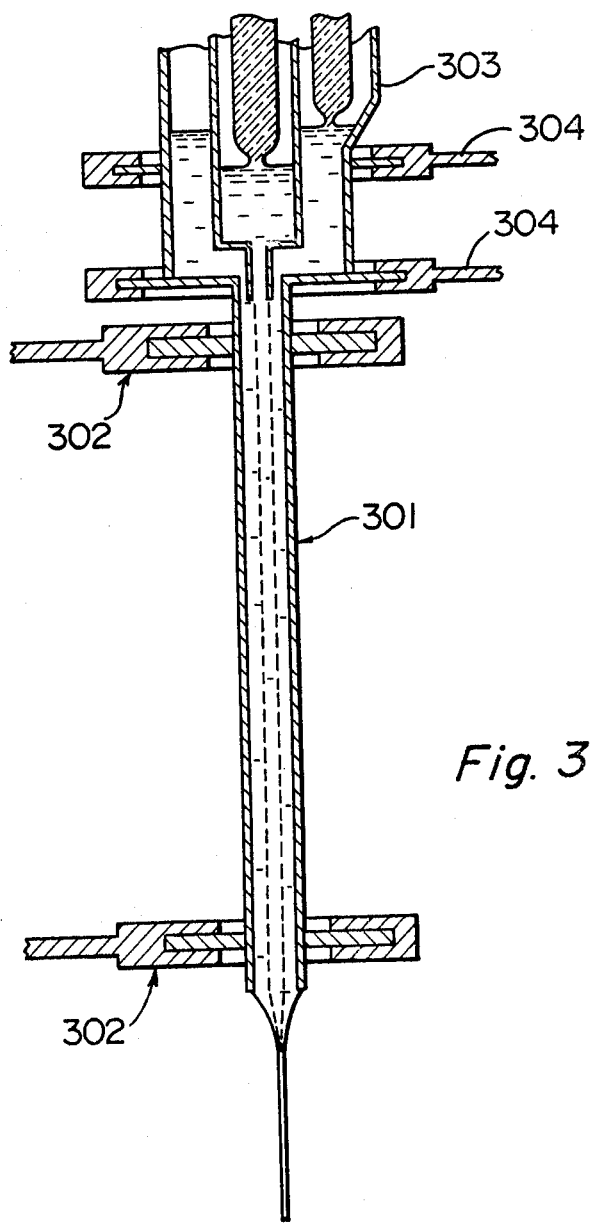
FIG. 3 is a sectional view of a spinning furnace which shows the principle of performing the present invention using a method of direct nozzle heating by applying a low-voltage large current.

The inner nozzle may be provided such that its exit 114 is opened into the inside of the outer nozzle 101 (for example, as shown in FIG. 3) so long as it is disposed coaxially with the outer nozzle. Or it may be provided such that its exit 114 is opened into the inside of the outer crucible 102 before reaching the inlet of the outer nozzle 101 (for example, as shown in FIG. 1 or 2). In the case of the former, the exit of the inner nozzle may be located at the same level as the exit of the outer nozzle. However, if the length of the inner nozzle is made too long, various disadvantages are caused. For example, when the outer nozzle is heated to a high temperature, the inner nozzle is exposed correspondingly to high temperatures, and this increases the opportunity of impurities diffusing from the material of the inner nozzle into the core-forming glass melt. In the production of optical glass fibers having a gradient refractive index distribution as shown in FIG. 5, (c), a sufficient time for contact between the core-forming glass melt and the cladding glass melt for ion exchange will not be obtained. It is desirable generally that the exit of the inner nozzle is opened at a position one half the length of the outer nozzle or at a position nearer the crucible, preferably at a position one-third the length of the outer nozzle or at a possition nearer the crucible. It is especially desirable that the exit of the inner nozzle be opened at a position near the inlet of the outer nozzle. When the exit of the inner nozzle is opened into the inside of the outer crucible, the distance between the exit of the inner nozzle and the inlet of the outer nozzle is not critical. Advantageously, this distance is adjusted generally to not more than 20 mm, preferably not more than 10 mm, and more preferably not more than 5 mm.

The inside diameter of the inner nozzle is not restricted strictly so long as it is smaller than the inside diameter of the outer nozzle. The ratio of the inside diameter of the outer nozzle to that of the inner nozzle is desirably within the range of 10:9 to 10:1, preferably 10:8 to 10:2, and 10:7 to 10:3. The outside diameter of the inner nozzle needs to be smaller than the inside diameter of the outer nozzle especially when the inside nozzle is located inside the outer nozzle. Although depending upon the thickness of the clad required of the optical glass fiber, the outside diameter of the inner nozzle is at least 1 mm, preferably at least 2 mm, smaller than the inside diameter of the outer nozzle.

The glass melt flowing down through the nozzle is taken up at the exit 113 of the outer nozzle 101. By this take-up, the glass melt is rapidly attenuated in the vicinity of the exit 113. Thus, as it well known, the diameter of the resulting fiber is determined according to the take-up speed. If the take-up speed is low, a glass fiber having a relatively large diameter can be obtained. If the take-up speed is higher, an optical glass fiber with a smaller diameter can be obtained.

The optical glass fiber so produced has the cross-sectional shape shown in FIG. 5, (a), and the refractive index distribution shown in FIG. 5, (b) or (c).

With reference to FIG. 1, the performance of the present invention has been described in regard to a method of heating the crucible and nozzles by an electric furnace. The method of heating is not limited to the use of an electric furnace, and high frequency induction heating and electrical resistance heating are also possible. In FIGS. 2 and 3, these other heating methods are described specifically. It should be noted that where no description is made, the same description as in FIG. 1 will apply.

FIG. 2 is a sectional view of a high-speed spinning furnace showing the principle of performing the present invention using a method of directly heating the crucible and nozzles with high frequency. A cylindrical, elongated outer nozzle 201 made of a metal such as platinum generates heat by induction heating induced by flowing a high frequency electric current through a coil 202 which surrounds the nozzle 201. This induction heating method has a high electric efficiency, and makes it relatively easy to maintain the temperature of the nozzle at as high as more than about 1200° C. A platinum outer crucible member 203 is similarly heated with a coil 204 by high frequency induction.

FIG. 3 is a sectional view of a high-speed spinning furnace showing the principle of performing the present invention by a method of directly heating the crucible members and nozzles using a low-voltage and a large current. A cylindrical elongated outer nozzle 301 made of a metal such as platinum generates heat when a large current of low voltage is caused to flow through it via two electrodes 302 which are located approximately at the upper and lower ends of the nozzle 301. This direct resistance heating method has a high heat efficiency, easily permits a precise control of temperature, and can simply attain high temperatures of at least about 1200° C. A platinum outer crucible member 303 is similarly heated electrically through two electrodes 304.

The above description has been made with regard to the performance of the present invention using a two-member crucible. The present invention can be equally applied to the production of optical glass fibers using a crucible consisting of two or more members. The invention is further described below with reference to the use of a three-member crucible.

Figure 4:
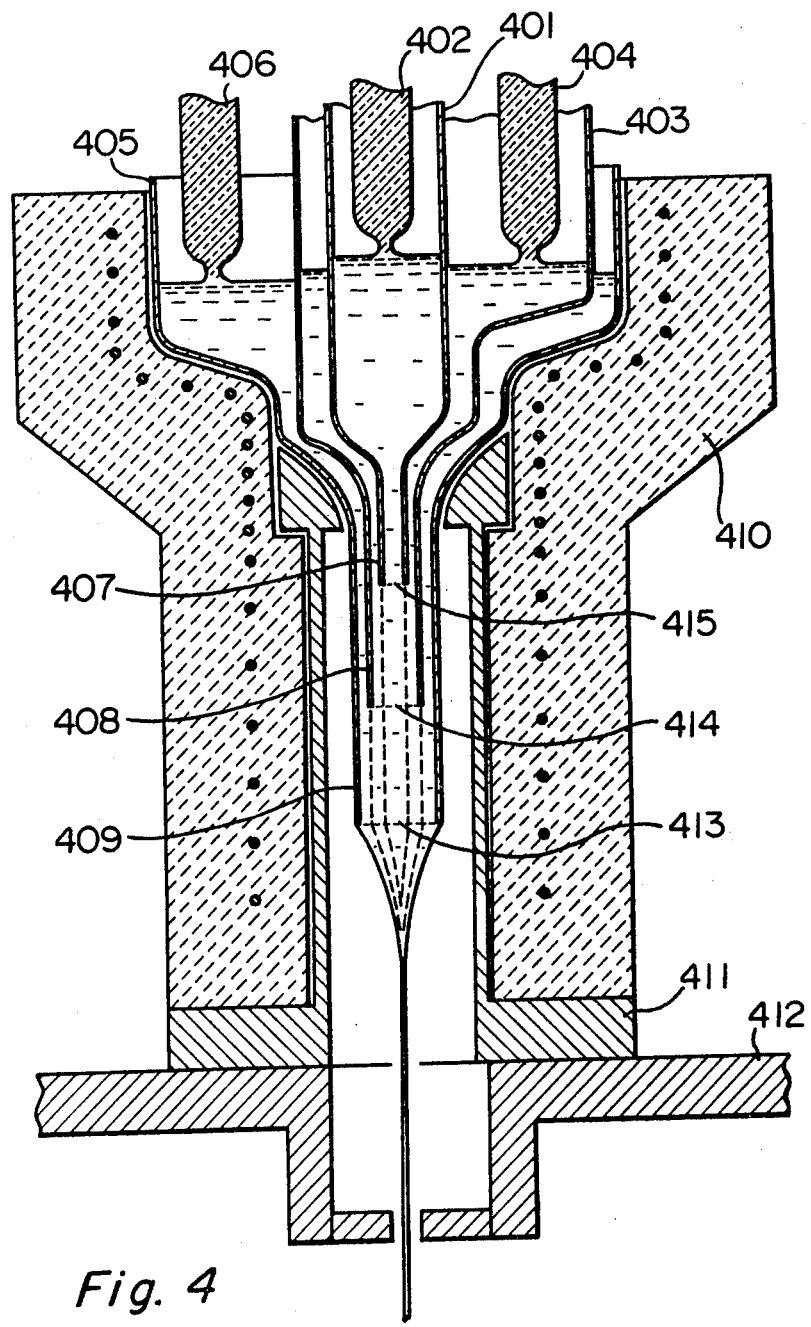
FIG. 4 is a sectional view of a spinning furnace showing one example of spinning optical fibers having a three layer structure by the method of this invention.
Figure 5A:
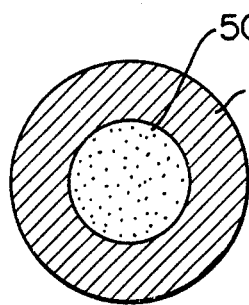
Figure 5B:
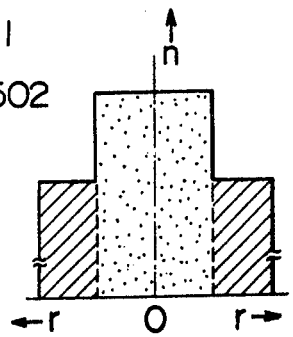
Figure 5C:
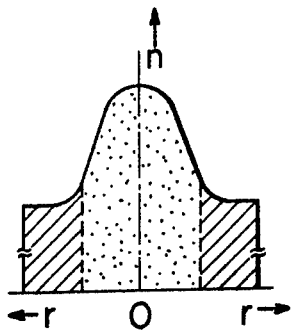
Figure 5D:
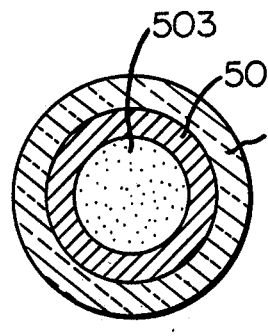
Figure 5E:
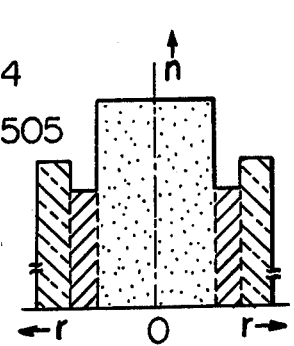
Figure 5F:
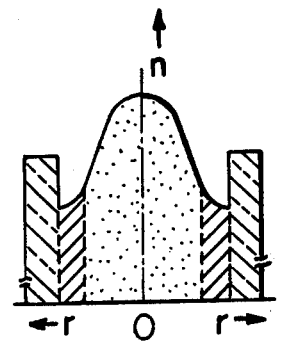

FIG. 4 shows an example of producing a low-loss optical fibers by an improved three-member crucible method in accordance with the present invention. The three-member crucible consists of an inner crucible 401 into which a low-loss glass 402 for a core is fed, an intermediate crucible 403 into which a cladding low-loss glass 404 is fed and which surrounds the inner crucible, and an outer crucible 405 surrounding the intermediate crucible and into which a glass 406 for a protective layer is fed continuously. The three crucible members are fixed so that the inner nozzle 407, the intermediate nozzle 408 and the outer nozzle 409 provided at the bottoms of these members are located coaxially. The three-member crucible and nozzles are maintained at certain high temperatures by an electric furnace 410, and by the melting of the material glasses 402, 404 and 406 fed from above, the glass melts within the crucible are maintained at certain water head values. These glass melts are associated at the nozzle portion, and drawn into an optical glass fiber having a three layer structure.

The outer crucible member 405 is supported by a support member 411, and the support member 411 and the electric furnace 410 may optionally be fixed to a vertically movable stand 412 equipped with a mechanism (not shown) of micro-adjustment of position. The inner crucible 401 and the intermediate crucible 403 are suspended by a support member (not shown) provided above the crucible. Similarly, the material glasses are suspended by feed devices (not shown) provided above the crucible.

The core-forming glass and the cladding glass may be the same as those described hereinabove. Examples of the glass which forms the protective layer are silicate glass, borosilicate glass and soda-lime-silicate glass. $Al_2O_3$ and $ZnO$ may be incorporated as glass ingredients for improving weatherability.

The outer nozzle 409 can be heated in the same way as described hereinabove with regard to the two-member crucible method. The length and inside diameter of the outer nozzle and the ratio of its length to diameter are also the same as those described hereinabove with regard to the two-member crucible method. A detailed description of these is omitted here.

The positions of the exits 414 and 415 respectively of the intermediate nozzle 408 and the inner nozzle 407 are not critical, and can be chosen freely. In an extreme case, the exits 414 and 415 may be at the same level as the exit 413 of the outer nozzle 409. But for the same reason as given hereinabove, for example to prevent a deviation or turbulence of the flow of the glass melt, the exit 414 of the intermediate nozzle 408 is desirable located inwardly of the exit 413 of the outer nozzle 409. Preferably, the exit 414 is positioned at least one half of the length of the outer nozzle 409, more preferably at least one-third thereof, near the crucible. The length of the intermediate nozzle is desirably as short as possible. Generally, it is 1 to 200 mm, preferably 2 to 100 mm, especially 3 to 50 mm. On the other hand, the inner nozzle 407 may be projected such that its exit 415 is opened into the inside of the outer nozzle 409, or as shown in FIG. 4, into the inside of the intermediate nozzle 408. Or in the same way as described hereinabove in regard to the two-member crucible, the inner nozzle 407 may be provided such that its exit is opened into the intermediate crucible 403. When the exit 414 is to be opened into the inside of the intermediate nozzle 408, it is advantageous to have the exit 415 situated at least one half, preferably at least one-third, of the length of the intermediate nozzle 408 near the crucible.

The inside and outside diameters of the intermediate nozzle 408 and the inner nozzle 407 are not critical, and can be determined optionally according to the characteristics required of the optical glass fibers to be produced. Generally, the intermediate nozzle 408 can have an inside diameter of 2 to 35 mm, especially 5 to 10 mm, and an outside diameter of 4 to 40 mm, preferably 7 to 15 mm. Desirably, the inner nozzle 407 has an inside diameter of 2 to 20 mm, preferably 3 to 8 mm, and an outside diameter of 4 to 25 mm, especially 5 to 10 mm.

The optical glass fiber so obtained has the cross-sectional shape shown in FIG. 5, (d), and the refractive index distribution shown in FIG. 5, (e) or (f) (in the drawing, n represents the refractive index, and r is the radius of the fiber).

In conventional three-member crucibles, the lengths of all nozzles are less than several millimeters. For this reason, in the production of low-loss optical glass fibers, glass melts flow deviatingly or turbulently in the vicinity of the nozzle portion. This tends to cause a variation in the outside diameter of the optical fibers, a variation in the diameter of the core and the diameter of the cladding layer, and an eccentrical arrangement of the core and the cladding layer. Consequently, the efficiency of connecting the fibers to one another at their ends becomes poor, and it is difficult to construct long-distance transmission channels. Furthermore, when multi-mode transmission is performed using these optical fibers having an insufficient dimensional precision, mode conversion tends to occur, and in spite of the three-layer structure, the loss increases or the transmission band changes. By selecting the length of the outer nozzle in accordance with this invention from the range of 30 to 2000 mm as shown in FIG. 4, and heating the outer nozzle at a high temperature within the above-specified range, it is possible to associate the glass melts flowing from the nozzles into a complete laminar flow, and the associated flow can be drawn from the exit of the nozzle for the outer crucible member to form an optical glass fiber. Hence, irregular sizes of fibers by the deviation or turbulent flowing of the melts can be prevented, and an optical fiber having a high dimensional precision over its large length can be obtained at high speeds. By increasing the length of the outer nozzle 409, the inside diameter of the outer nozzle can be increased over the conventional method. A nozzle having a large inside diameter has good processing precision and its position in coaxial arrangement is easy to control. As a result, an optical fiber having a small amount of deviation and good cross-sectional circularity can be obtained at a high speed.

According to another aspect of this invention, an optical glass fibers having a three-layer structure shown in FIG. 5, (d) can be produced at a high speed by using a modified form of spinning furnace which consists of the aforesaid two-member crucible and an auxiliary nozzle. The principle of this process is shown in FIG. 6.

In FIG. 6, the crucible is a two-member crucible consisting of an inner crucible 601 and a surrounding outer crucible 603 which are so disposed that the nozzles provided at the bottoms of these crucible members are coaxial.

A low-loss glass 602 for a core and a low-loss glass 604 for a cladding layer are continuously fed into an inner crucible 601 and an outer crucible 603, respectively. The inner and outer crucible members are suspended by support members (not shown) provided above the crucibles, and fixed so that the nozzles for these crucible members are positioned coaxially. Likewise, the core-forming glass and the cladding glass are suspended from feed devices (not shown) provided above the crucible members. The two-member crucible is maintained at a certain high temperature by, for example, an electric furnace 605. The two material glasses fed change to glass melts 610 and 611 having certain water head values. The melt 610 flows down through an inner nozzle 612 provided at the bottom of the inner crucible. At the bottom of the outer crucible member 603, a long cylindrical outer nozzle 613 is provided coaxially with the inner nozzle 612, and heated by an electric furnace 605.

In the embodiment shown in FIG. 6, the outer surface of the outer nozzle is covered with the auxiliary nozzle, but the auxiliary nozzle is just for an auxiliary purpose, and the outer nozzle 613 becomes the outermost nozzle. The conditions for heating the outermost nozzle and its length and inside diameter are chosen from the ranges described hereinabove.

The melts 610 and 611 then gather coaxially in the form of a laminar flow, and go down through the outer nozzle 613. To the outer nozzle 613 having a length of more than 30 mm is fixed a cylindrical auxiliary nozzle 606 by means of a support stand 608. The auxiliary nozzle 606 is fixed coaxially with the outer nozzle 613 by means of a vertically movable stand 609 equipped with a mechanism (not shown) for micron-adjustment of position. A material glass 607 for a protective layer is heated by the electric furnace 605, and changes to a melt 614 which is then fed continuously into the auxiliary nozzle 606 from an opening provided at the upper part of the auxiliary nozzle so that it is maintained at a certain water head value within the auxiliary nozzle. The melt 614 for the protective layer is associated in the form of a laminar flow with the glass melts for the core and the cladding layer, and drawn from an exit at the lower end of the auxiliary nozzle 606 to form an optical fiber having a three-layered structure at a high spinning speed.

The present invention makes it possible to produce low-loss optical fibers of a multi-component glass at high spinning speeds reaching several tens of kilometer per hour by using a multi-member crucible having a long cylindrical nozzle of a specified length at the bottom of the outermost crucible member and heating the long nozzle to increase the flow rate of glass. This method can be performed continuously over long periods of time by continuously supplying material glasses or melts of the material glasses from the top of the crucible. By using one spinning apparatus, an optical fiber can be produced which measures several hundred thousand kilometers per year. The optical fibers produced by the present invention can have an exact reproduction of the low loss of the material glass, because the core and the neighboring glass can avoid contamination by impurity ions from the material that makes up the nozzles. Since the glass melt which flows down through a long outer most nozzle forms a laminar stream, the outside diameter of the resulting optical fiber, the diameter of the core, and the concentricity of the core and the outside diameter of the fiber have a high dimensional precision. If the present invention is applied to the production of focusing-type multi-component optical fibers [for example, having refractive indices shown in FIG. 5, (c) and (f)], a dopant ion in the core glass can be exchanged with the ion in the cladding glass over a sufficient period of time by utilizing a long nozzle. Accordingly, broad-band optical fibers having a large core diameter can be obtained. Focusing-type optical fibers having a large core diameter easily permit incoming of light beams or can be easily connected to one another, and have superior practical applicability.

In the present invention, the nozzles and the crucibles may be heated by the same or different methods. Furthermore, it is not altogether necessary that the inside diameter of the nozzle be the same along the entire length of the nozzle. The nozzle may be of a type whose inside diameter decreases progressively. On the other hand, the present invention can be applied not only to the production of optical fibers, but also to the production of pre-forms for drawing optical fibers.

The present invention can also give optical fibers of a three-layered structure which have stable multi-mode transmission characteristics and a high dimensional precision. When the outermost nozzle has a length of more than 30 mm, a variation in the outside diameter of the optical fibers can be limited to 1 micron or less. Furthermore, since the outer nozzle is long, its outside and inside diameters can be increased, and processing precision and concentricity can be increased. The use of a pure platinum crucible with the outer nozzle having an outside diameter of at least 10 mm can give optical fibers having a circularity of more than 99% and a core deviation of less than 1 micron. Accordingly, the optical fibers so produced can be formed into a long, low-loss light transmission channel by a simple method. The optical fibers of a three-layered structure produced by the present invention can permit a drastic decrease in the amount of a cladding material glass which requires low loss. For example, an optical fiber of a multi-component glass having a core diameter of 60 $\mu$m and an outside diameter of 150 $\mu$m, if it is of a two-layer structure, requires about 37 kg of the cladding glass per 1000 km. But if the structure is changed to a three-layer structure and the outside diameter of the cladding layer is decreased to 100 $\mu$m, the amount of the cladding glass required decreases to 13 kg per 1000 km. The cost of producing optical fibers of a multi-component glass is dominated by the cost of the material glasses if the amount of the optical fibers produced increases. Hence, the reduction of the amount of the low-loss glass has a great effect on the reduction of the cost of producing optical fibers. The use of a material having good water resistance, alkali resistance and acid resistance for a protective glass layer which constitutes the outermost layer of the three-layer structure is preferred since it makes possible the production of optical fibers having good weatherability. Furthermore, by making the coefficient of expansion of the glass in the protective layer lower than that of the cladding glass, a compression strain is formed in the protective layer, and the mechanical strength of the optical fibers can be increased.

If the method of the present invention is applied to the production of focusing-type three-layered optical fibers utilizing the diffusion of a dopant ion by ion exchange, the nozzle for the intermediate crucible member (in the case of a three-member crucible) or the nozzle for the outer crucible member (in the case of a two-member crucible) is made sufficiently long so as to secure a diffusion time sufficient for forming the desired distribution of refractive index when the melts of the core glass and the cladding glass gather coaxially and are flowing down. As a result, optical glass fibers having favorable distributions of refractive index can be provided.

The optical glass fibers provided by the present invention are used, for example, for communication light transmitting channels, and light transmission lines for processing or controlling information or signals.

The following Examples illustrate the present invention in greater detail.

EXAMPLE 1

Using a spinning furnace adapted to be heated indirectly as shown in FIG. 1, a step-type optical fiber was spun from a soda-borosilicate glass having a viscosity of about 1000 pieses at 970° C. Specifically, glass consisting of 55% by weight of $SiO_2$, 20% by weight of $B_2O_3$, 19% by weight of $Na_2O$ and 6% by weight of CaO and having a refractive index of 1.533 was used as a material for the core, and glass consisting of 67% by weight of $SiO_2$, 11% by weight of $B_2O_3$ and 22% by weight of $Na_2O$ and having a refractive index of 1.513 was used as a material for the cladding layer. The spinning furnace included an outer nozzle 101 having a length of 50 mm and an inside diameter of 8 mm, and an inner nozzle having an outside diameter of 7 mm, an inside diameter of 6 mm and a length of 25 mm with the tip of the inner nozzle located 3 mm above the inlet opening of the outer nozzle. The temperature of the crucible was maintained at 970° C., the temperature of the central portion of the outer nozzle at 1050° C., and the temperature of its lower end at 1000° C. An optical fiber having an outside diameter of 150 microns and a core diameter of 100 microns could be obtained at a spinning speed of 15 km per hour under these conditions.

The above procedure was repeated except that an inner nozzle having an outside diameter of 9 mm and an inside diameter of 8 mm with the other specifications being the same as described above and an outer nozzle having a length of 100 mm and an inside diameter of 10 mm were used, and the temperature of the crucible portion, the temperature of the center of the outer nozzle, and the temperature of the forward end of the outer nozzle were maintained respectively at 970° C., 1100° C., and 1060° C., an optical glass fiber having an outside diameter of 150 microns and a core diameter of 100 microns could be obtained at a spinning speed of 35 km per hour. Low loss values were obtained even when the inner nozzle 112 was replaced by one having an inside diameter of 3 to 7 mm and the core diameter was changed within the range of 20 microns to 120 microns. The fluctuations of the outside diameter and the core diameter were less than 1%, and the amount of eccentricity between the outside diameter and the core was less than 1 micron.

EXAMPLE 2

Using a spinning furnace adapted to be heated indirectly as shown in FIG. 1, a focusing-type optical fiber was spun from a soda-borosilicate base glass having a viscosity of about 1000 poises at 950° C. A glass composition for a core had a refractive index of 1.533 and consisted of 55% by weight of $SiO_2$, 20% by weight of $B_2O_3$, 18% by weight of $Na_2O$ and 7% by weight of $Ti_2O$, and a glass composition for a cladding layer had a refractive index of 1.513 and consisted of 65% by weight of $SiO_2$, 12% by weight of $B_2O_3$ and 23% by weight of $Na_2O$. An outer nozzle having a length of 500 mm and an inside diameter of 10 mm, and an inner nozzle having an outside diameter of 8 mm and an inner diameter of 6 mm were used. The forward end of the inner nozzle was located 3 mm above the inlet of the outer nozzle. The temperature of the crucible was 950° C. The temperature of the central portion of the outer nozzle was maintained at 1080° C., and its lower end, at 1030° C. An optical fiber having an outside diameter of 150 microns could be obtained at a spinning speed of 20 km per hour under these conditions. The core diameter of the fiber was 50 microns. The distribution of the refractive index of the inside of the core was parabolic, and a band of 1000 megahertz per kilometer was obtained.

An optical fiber having a core diameter of 75 microns which was obtained by increasing the head of the core-forming glass melt in the crucible for the core thereby to increase the flow rate of the core-forming glass had a band of 400 megahertz, and exhibited a low loss and a good dimensional precision.

EXAMPLE 3

Using a direct heating method using high frequency as shown in FIG. 2, a step-type optical fiber was spun from a soda-lime-silicate glass having a viscosity of about 1000 poises at 1050° C. A glass composition for a core had a refractive index of 1.546 and consisted of 66% by weight of $SiO_2$, 15% by weight of $Na_2O$ and 19% by weight of CaO, and a glass composition for a cladding layer had a refractive index of 1.527 and consisted of 68% by weight of $SiO_2$, 17% by weight of $Na_2O$ and 15% by weight of CaO. An outer nozzle having a length of 200 mm and an inside diameter of 10 mm was used. The inner nozzle used had the same size and location as that used in Example 2. The crucible was maintained at a temperature of 1050° C., and a high frequency of 10 kilocycles at 5 kilowatts was applied to the outer nozzle to maintain the central portion of the outer nozzle at 1230° C., and its lower end at 1120° C. An optical fiber having a core diameter of 60 microns, an outside diameter of 150 microns, a good dimensional precision and a low loss could be obtained under these conditions at a spinning speed of 45 km per hour over long periods of time.

EXAMPLE 4

Using a direct resistance heating method as shown in FIG. 3, a step-type optical fiber was spun from a soda-lime-silicate glass having a viscosity of about 1000 poises at 1080° C. A glass composition for a core had a refractive index of 1.545 and consisted of 68% by weight of $SiO_2$, 14% by weight of $Na_2O$ and 18% by weight of Ca. A glass composition for a cladding layer had a refractive index of 1.525 and consisted of 70% by weight of $SiO_2$, 16% by weight of $Na_2O$ and 14% by weight of CaO.

An alternate current of 2 volts and 300 amperes was passed through an outer nozzle having a length of 1000 mm and an inside diameter of 20 mm, and the temperature of the central portion of the nozzle was maintained at 1250° C., and the temperature of its lower end at 1130° C. The crucible was maintained at 1080° C. The inner nozzle used had an outside diameter of 16 mm and an inside diameter of 14 mm with its forward end being at the same height as the inlet of the outer nozzle. An optical fiber having an outside diameter of 150 microns and a core diameter of 60 microns could be obtained at a spinning speed of 60 km per hour under these conditions. When the temperature of the central portion of the nozzle was lowered to 1080° C., and the temperature of its lower end to 1000° C., and the spinning speed was set at 1 meter per hour, performs having an outside diameter of 10 mm and a core diameter of 4 mm could be produced.

EXAMPLE 5

Using a three-member crucible equipped at its bottom with an outer nozzle having an inside diameter of 20 mm and a length of 200 mm, a step-type optical fiber consisting of a core 103, a cladding layer 104 and an outermost layer 105 as shown in FIG. 5, (d) was spun from a soda-lime-silicate glass having a viscosity of about 1000 poises at a temperature of 1020° C. by the method based on the principle shown in FIG. 4. A glass composition for a core had a refractive index of 1.549 and consisted of 64% by weight of $SiO_2$, 16% by weight of $Na_2O$ and 20% by weight of CaO. A glass composition for a cladding layer had a refractive index of 1.530 and consisted of 66% by weight of $SiO_2$, 18% by weight of $Na_2O$ and 16% by weight of CaO. A glass composition for an outermost layer had a refractive index of 1.535, and consisted of 66% by weight of $SiO_2$, 20% by weight of $Na_2O$, 10% by weight of CaO and 4% by weight of BaO.

The crucible also included an inner nozzle 407 having an outside diameter of 10 mm, an inside diameter of 6 mm and a length of 50 mm with its forward end being positioned 20 mm below the fixing part of the outer nozzle, and an intermediate nozzle 408 having an outside diameter of 16 mm, an inside diameter of 14 mm and a length of 100 mm with its forward end being positioned 80 mm below the fixing part of the outer nozzle.

A fiber spun at a speed of about 30 km per hour while maintaining the temperature of the crucible portion at 1020° C. the temperature of the control portion of the nozzle at 1050° C., and the temperature of its lower end at 1030° C. could retain a high dimensional precision, represented by a fiber outside diameter of 150 μm ± 1 μm, a clad outside diameter of 120 μm ± 1 μm, a core outside diameter of 80 μm ± 1 μm, and a core eccentricity of less than 1 μm, over its large length. The distribution of its refractive index had the configuration shown in FIG. 5, (e). The light which was transmitted through the fiber over a distance of 5 km showed a steady distribution of mode, and had a number of apertures of 0.20. When light beams fall upon the optical fiber at this aperture number, the loss of light is less than 3 dB/km at a wavelength of 0.80 μm to 0.85 μm, and a band of 50 megahertz.km was obtained. When the optical fibers were coated with plastics and bundled to make an optical cable, variations in loss and band in the cable were negligibly small.

EXAMPLE 6

Using a three-member crucible equipped at the bottom of the outermost crucible member with an outer nozzle having an inside diameter of 25 mm and a length of 1000 mm, a focusing-type optical fiber was spun from a soda-borosilicate glass having a viscosity of about 1000 poises at a temperature of 950° C.

Glass compositions for a core and a cladding layer were the same as those used in Example 2. A glass composition for an outermost layer had a refractive index of 1.518 and consisted of 65% by weight of $SiO_2$, 10% by weight of $B_2O_3$, 20% by weight of $Na_2O$ and 5% by weight of ZnO.

The crucible also included an inner nozzle having an outside diameter of 12 mm, an inside diameter of 10 mm and a length of 130 mm with its forward end being positioned 100 mm below the fixing part of the outer nozzle, and an intermediate nozzle having an outside diameter of 20 mm, an inside diameter of 16 mm and a length of 200 mm with its forward end being positioned 180 mm below the fixing part of the outer nozzle.

The ion exchange distance over which the core glass and the cladding glass flowed down in contact with each other within the nozzle for the outermost crucible member was adjusted to 900 mm, and the temperature of the center of the outer nozzle was maintained at 950° C., and the temperature of its lower end at 900° C. The crucible temperature was 950° C. Under these conditions, a fiber was produced at a spinning speed of about 15 km per hour. The resulting fiber had a fiber outside diameter of 150 μm, a cladding outside diameter of 100 μm and a core outside diameter of 60 μm, and a distribution of refractive index having the configuration shown in FIG. 5, (f). The dimensional precision of the fiber was high over its large length. An optical cable produced from the resulting optical fibers could give a low loss of less than 5 dB/km and a broad band of at least 1 gigahertz km in multimode transmission when a semiconductor laser was used as a light source.

EXAMPLE 7

Using the apparatus shown in FIG. 6 which included an outer nozzle 613 having an outside diameter of 10 mm, an inside diameter of 6 mm and a length of 100 mm, a steptype optical fiber having a three layer structure was spun from a soda-lime-silicate glass having a viscosity of about 1000 poises at a temperature of 1020° C. The glass compositions used were the same as in Example 5. The apparatus also included an inner nozzle having an outside diameter of 4 mm, an inside diameter of 3 mm and a length of 3 mm with its forward end being positioned 2 mm below the fixing part of the outer nozzle, and an auxiliary nozzle having an outside diameter of 20 mm, an inside diameter of 16 mm and a length of 40 mm with its forward end being on the same level as the forward end of the outer nozzle.

While maintaining the temperature of the center of the outer crucible member at 1020° C., the temperature of the auxiliary nozzle 606 and the central part of the outer nozzle at 1050° C., and the temperature of the forward end of the outer nozzle at 1000° C., an optical fiber was obtained at a speed of about 20 km per hour. The fiber could retain a high dimensional precision, represented by a fiber outside diameter of 150 μm ± 1 μm, a cladding outside diameter of 120 μm ± 1 μm, a core outside diameter of 80 μm ± 1 μm, and a core eccentricity of less than 1 μm, over its large length. The fiber had a distribution of refractive index shown in FIG. 5, (e). Light beams which had been transmitted through the fiber over a distance of 5 km showed a steady mode distribution, and had a number of apertures of 0.20. When multimode transmission was performed by passing light beams having this aperture number, the light loss was less than 3 dB per kilometer at a wavelength of 0.80 μm to 0.85 μm, and a band of 50 megahertz.km was obtained. When the fiber was coated with a plastic material, and coated optical fibers were formed into an optical cable, variations in loss and band in the cable were negligibly small.

EXAMPLE 8

A two-member crucible of the type shown in FIG. 6 was used which had an outer nozzle 613 having an outside diameter of 22 mm, an inside diameter of 18 mm and a length of 1000 mm at the bottom of outer crucible member 603 and an inner nozzle having an outside diameter of 12 mm, an inside diameter of 10 mm and a length of 100 mm with its forward end being positioned 900 mm above the forward end of the outer nozzle. An auxiliary nozzle 606 having an outside diameter of 30 mm, an inside diameter of 26 mm and a length of 100 mm with its forward end being of the same level as the forward end of the outer nozzle was provided at the exit end of the outer nozzle. A focusing-type optical fiber was spun from a soda-borosilicate glass having a viscosity of about 1000 poises at a temperature of 950° C. in the spinning furnace shown in FIG. 6.

The glass compositions were the same as in Example 6.

The ion-exchange distance over which the coreforming glass and the cladding glass flowed down in contact with each other within the outer nozzle 613 was adjusted to 900 mm, and the temperature of the center of the nozzle was maintained at 950° C. and the temperature of its lower end at 900° C. The crucible was maintained at 950° C. An optical fiber was produced under these conditions at a spinning speed of about 10 km per hour. The fiber obtained had an outside diameter of 150 μm, a cladding outside diameter of 100 μm and a core outside diameter of 60 μm, and showed a refractive index distribution of the pattern shown in FIG. 5, (f). The dimensional precision of the fiber was high along its large length. With an optical cable produced from the resulting optical fibers, a low loss of less than 5 dB/km and a broad band of about 1 gigahertz.km could be obtained in multimode transmission using a semiconductor laser as a light source.

What we claim is:

1. In a method for producing optical glass fibers which comprises co-spinning glass melts of different kinds through coaxially disposed discharge nozzles of a multi-member crucible composed of two or more crucible members having a discharge nozzle at their bottom, the improvement wherein the outermost nozzle has a length of 30 mm to 2000 mm and is heated so that at least a part of it is maintained at a temperature equal to, or higher than, the temperature of the crucible thereby to increase the speed of spinning.

2. The method of claim 1 wherein the length of the outermost nozzle is not more than 50–1000 mm.

3. The method of claim 1 wherein the outermost nozzle has an inside diameter of 4 to 50 mm.

4. The method of claim 1 wherein the length-to-inside diameter ratio of the outermost nozzle is at least 3.

5. The method of claim 1 wherein the length-to-inside diameter ratio of the outermost nozzle is 5 to 60.

6. The method of claim 1 wherein the outermost nozzle is heated so that at least the central part of the outermost nozzle in its longitudinal direction is maintained at a temperature at least 100° C. higher than the temperature of the crucible.

7. The method of claim 1 wherein at least one nozzle located coaxially with, and inwardly of, the outermost nozzle has a length not more than one-half of the length of the outermost nozzle.

8. The method of claim 1 wherein the multi-member crucible is made of platinum and consists of two or three members.

9. A high-speed spinning furnace for optical glass fibers, said furnace comprising a multi-member crucible composed of two or more crucible members having a glass melt discharging nozzle at their bottom, the individual nozzles being disposed coaxially, and means for externally heating the multi-member crucible and the discharge nozzles, the outermost nozzle having a length of at least 30 mm.

10. The furnace of claim 9 wherein the length of the outermost nozzle is not more than 2,000 mm.

11. The furnace of claim 9 wherein the length of the outermost nozzle is 50 to 1,000 mm.

12. The furnace of claim 9 wherein the outermost nozzle has an inside diameter of 4 to 50 mm.

13. The furnace of claim 9 wherein the length-to-inside diameter ratio of the outermost nozzle is at least 3.

14. The furnace of claim 9 wherein the length-to-inside diameter ratio of the outermost nozzle is from 5 to 60.

15. The furnace of claim 9 wherein at least one nozzle located coaxially with, and inwardly of, the outermost nozzle has a length not more than one-half the length of the outermost nozzle.

16. The furnace of claim 9 wherein the multi-member crucible is made of platinum, and consists of two or three members.

* * * * *